(12) United States Patent
Moriyama et al.

(10) Patent No.: US 7,229,583 B2
(45) Date of Patent: *Jun. 12, 2007

(54) METHOD OF PRODUCING A GOLF BALL

(75) Inventors: Keiji Moriyama, Kobe (JP); Takashi Sasaki, Kobe (JP); Satoshi Iwami, Kobe (JP); Tsutomu Hirau, Kobe (JP); Masaaki Kikuchi, Kobe (JP)

(73) Assignee: SRI Sports Limited, Kobe (JP)

( * ) Notice: Subject to any disclaimer, the term of this patent is extended or adjusted under 35 U.S.C. 154(b) by 216 days.

This patent is subject to a terminal disclaimer.

(21) Appl. No.: 10/834,014

(22) Filed: Apr. 29, 2004

(65) Prior Publication Data

US 2004/0217516 A1    Nov. 4, 2004

(30) Foreign Application Priority Data

May 2, 2003     (JP)     ............... 2003-126922

(51) Int. Cl.
*B29C 43/18*     (2006.01)

(52) U.S. Cl. ............... 264/248; 264/250; 264/279.1; 264/325

(58) Field of Classification Search ............ None
See application file for complete search history.

(56) References Cited

U.S. PATENT DOCUMENTS

| | | | | |
|---|---|---|---|---|
| 5,816,937 A | * | 10/1998 | Shimosaka et al. | 473/354 |
| 6,093,357 A | * | 7/2000 | Bissonette et al. | 264/248 |
| 2003/0064828 A1 | | 4/2003 | Kato | |

* cited by examiner

*Primary Examiner*—Edmund H. Lee
(74) *Attorney, Agent, or Firm*—Birch, Stewart, Kolasch & Birch LLP

(57) ABSTRACT

A method of producing a golf ball with uniform thickness by, eliminating defective air between the cover and the core, an insufficient thickness of the cover and an uneven thickness of the cover wherein in the step of heat and compression molding to cover the core or an intermediate layer with shells molded from a cover material mainly composed of a thermoplastic resin, if the mold has a temperature of T1° C. and the half shells start to flow at a temperature of T2° C., T1 minus T2 is set within a range of −3° C. to +10° C.

4 Claims, 1 Drawing Sheet

METHOD OF PRODUCING A GOLF BALL

This nonprovisional application is based on Japanese Patent Application No. 2003-126922, filed with the Japan Patent Office on May 2, 2003, the entire contents of which are hereby incorporated by reference.

BACKGROUND OF THE INVENTION

1. Field of the Invention

The present invention relates to methods of producing golf balls, capable of forming a cover having a uniform thickness to produce a golf ball excellent in durability.

2. Description of the Conventional Art

Conventionally in producing a golf ball, an injection molding process or a heat and compression molding process is generally employed to place a cover on a core. In the injection molding process, at an initial stage of injection of a material for the cover, the core is held by a pin at the center of a cavity and when the injection enters a final stage, the pin recedes. As such, the injection molding process can result in the core having its center offset from the ball's center and tend to produce a cover having an uneven thickness. A golf ball having a cover with a large thickness (for example of 1.4 to 2.3 mm) often ensures that it has sufficient physical properties, even if injection molding provides a cover having an uneven thickness. If a cover has a small thickness (for example of 0.3 to 1.0 mm), however, and the thickness is uneven, which significantly and negatively affects the ball's performance. Injection molding has its limit when it is used as described above.

By contrast, the heat and compression molding process, as compared with the injection molding process, can form a cover to have a uniform thickness. Accordingly for a cover having a small thickness, the heat and compression molding process can be suitably employed.

U.S. Publication No. US 2003/0064828 A1 describes that in producing a solid golf ball including a cover having a thickness of 0.5 to 2.0 mm the cover's material or two half shells are compression molded to cover an intermediate layer. However, heat and compression molding the cover material to produce a solid golf ball, causes air to remain between the cover and the core, and the cover material excessively flows out of the mold, resulting in an insufficient thickness of the cover, and an uneven thickness of the cover.

SUMMARY OF THE INVENTION

The present invention has been made to overcome the above described disadvantages and contemplates a method of producing a golf ball with excellent durability that employs a heat and compression molding process to produce a golf ball having a cover with a small and uniform thickness, and in particular, by not allowing air to remain between the cover and the core, and providing the cover with an insufficient an uneven thickness.

The present invention provides a method of producing a golf ball, which comprises molding a cover material mainly composed of a thermoplastic resin into two half shells which are, in turn, arranged on a core or an intermediate layer and joined together and then introduced into a mold formed of semispherical, (top and bottom) pieces, and subjecting the composite to heat and compression to allow a cover to cover the core or the intermediate layer. In the heat and compression molding process if the mold has a temperature T1° C. and the half shells start to flow at a temperature T2° C., T1 minus T2 is set within a range of −3° C. to +10° C. In the present method preferably the two half shells have a total volume of 105% to 120% relative to that of the cover of the golf ball. Furthermore in the present method the heat and compression molding process preferably includes a low pressure molding step of exerting a pressure set within a range of 0.5 to 5 MPa and a subsequent, high pressure molding step of exerting a pressure set within a range of 7 to 15 MPa. Furthermore the cover is preferably designed to have a thickness of 0.3 to 1.0 mm.

In the present invention a "thermoplastic resin" indicates a synthetic resin that can provide a plasticity allowing it to be molded as it is heated, and includes not only those which do not exhibit flowability at room temperature but also a thermoplastic elastomer formed of a hard segment and a soft segment, rubber and the like. Furthermore, " . . . mainly composed of a thermoplastic resin" means that no less than 50% by mass of the cover material is occupied by the thermoplastic resin. In the present invention in a heat and compression molding process the mold has a temperature, which is a temperature of a surface of the mold attaining a highest temperature throughout the heat and compression molding process. Furthermore in the present invention two half shells' volume in total and a cover's volume are both at room temperature.

In accordance with the present invention the heat and compression molding process can be performed with a mold having a temperature controlled to fall within a fixed range relative to a temperature allowing the half shells to start to flow, and preferably the heat and compression molding process can exert a pressure controlled to fall within a fixed range and the half shell can have a volume controlled to fall within a fixed range so that a golf ball including a cover having a small and uniform thickness, in particular, can be produced without defective air between the cover and the core, an insufficient thickness of the cover, an uneven thickness of the cover or the likes. A golf ball having excellent durability can thus be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
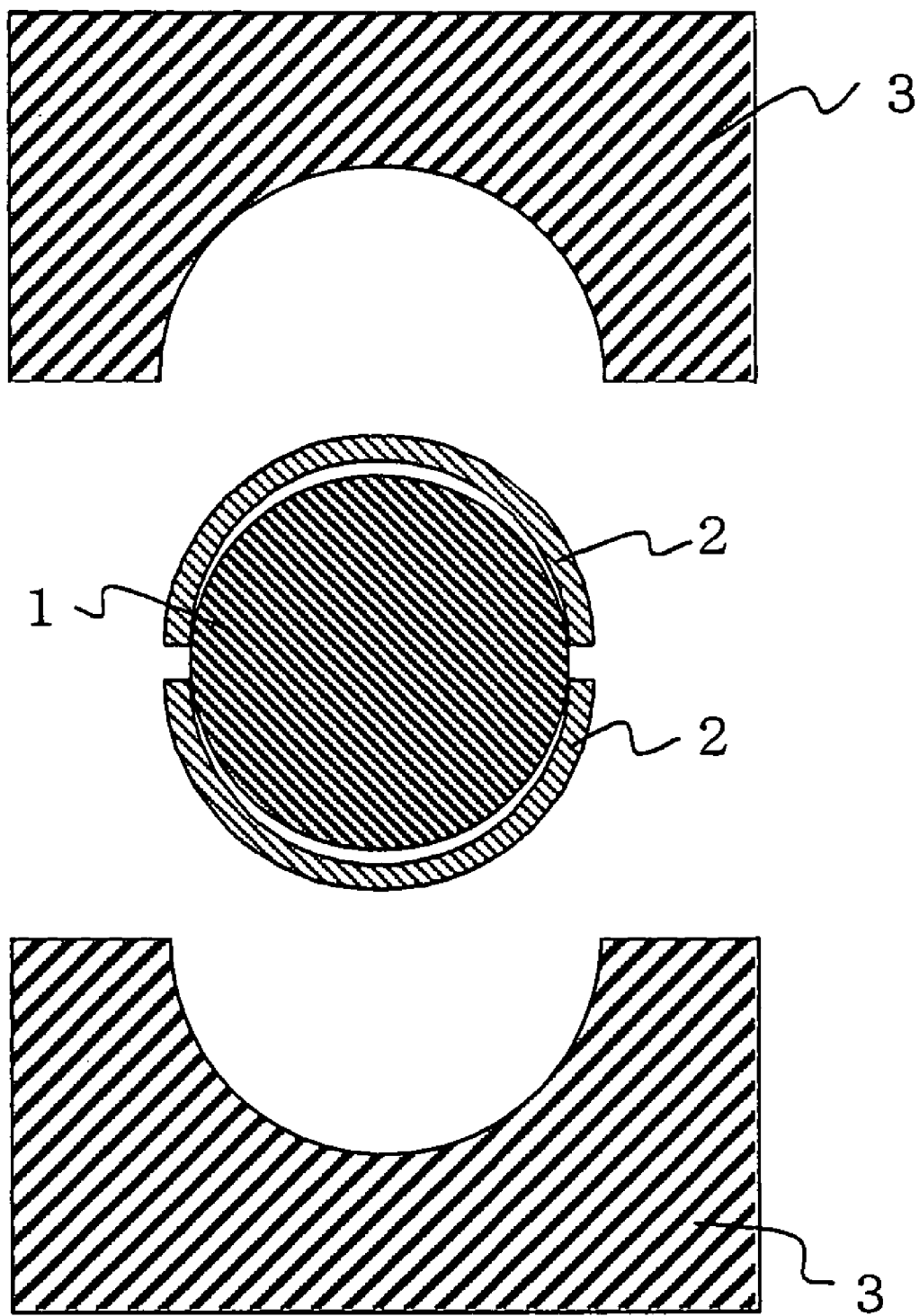
FIG. 1 is a cross section for illustrating a typical heat and compression molding process in accordance with the present invention.

In the present invention a cover material mainly composed of a thermoplastic resin is molded into a half shell and two such half shells are joined together on a previously molded core or intermediate layer to cover it and the intermediate product is then introduced into a mold formed of semispherical, top and bottom pieces, and heat and compression molded, as will be described hereinafter with reference to the drawing.

With reference to FIG. 1, a ball material formed of a core 1 and two half shells 2 covering the core is set in a mold formed of semispherical pieces 3 and the mold is clamped for example by a press, preferably by a pressure set at 0.5 to 5 MPa for a low pressure molding step and 7 to 15 MPa for a high pressure molding step. At room temperature the two half shells have a volume preferably set to be 105 to 120% relative to that of a cover of a ball at room temperature. The volume of the cover of the ball is that of a cover of a completed ball. Furthermore in the heat and compression molding process the mold has a temperature T1 set so that T1−T2=−3 to +10° C. if the half shells start to flow at a temperature T2. When the mold is clamped to pressurize the intermediate product the half shells melt and flow with an appropriate melt viscosity being maintained. If the two half shells have a total volume 1 larger than the cover's volume, an excessive amount of cover material flows out of the mold at the mold's gap formed between the top and bottom pieces. Together with the excessive amount of the cover material, air remaining between the core and the half shells is also exhausted from the mold.

While the cover material flows out through a low pressure molding step and a high pressure molding step, the air is substantially, completely exhausted in the low pressure molding step. More specifically, in the present method a relatively low pressure is set for the low pressure molding step to prevent the cover material from rapidly flowing out and also to substantially, completely exhaust the air, and the excessive amount of cover material is further removed in the high pressure molding step. This two-step process, as described above, can prevent air from remaining between the core and the cover and also the cover from having an insufficient thickness.

After the high pressure molding step is completed the mold is still maintained clamped and the temperature is reduced to slowly cool the obtained molding. After the molding is sufficiently reduced in temperature it is removed from the mold and, for example, painted as appropriate to complete the golf ball.

In the present invention in the heat and compression molding process the mold preferably has a temperature so set that T1−T2=−3 to +10° C., preferably −2 to +8° C., if the half shells start to flow at a temperature T2. If T1 minus T2 is smaller than −3° C., the mold has too low a temperature and the cover material insufficiently melts. Also, in particular, the portions of the half shells that are joined together have an insufficient strength. This produces poor durability and also contributes to a cover having an uneven thickness. If T1 minus T2 is greater than +10° C., the cover material has a low melt viscosity and excessively flows in the mold. As such, the cover's thickness cannot be controlled and the cover thus has an insufficient thickness.

Preferably, the mold with the half shells set therein has a temperature set to be lower by 15 to 80° C. than that allowing the half shells to start to flow, and thereafter in a molding process the mold's temperature is raised to temperature T1. This can prevent the cover material from excessively flowing out of the mold. Thus a cover can be more uniformly.

In the present invention the two half shells have a total volume preferably set to be 105 to 120%, more preferably 110 to 115%, most preferably 112 to 114% relative to that of the cover of the golf ball. If the two half shells have a total volume of no less than 105% relative to that of the cover of the golf ball, in the heat and compression molding process the cover material has no less than the amount thereof flowing out of the mold. This enables the amount of the cover material flowing out to be controlled to prevent the cover from having an insufficient thickness. Furthermore, the two half shells' total volume that is no more than 120% relative to that of a cover of a golf ball provides a reduced possibility of the cover material from having a large amount thereof flowing out of the mold. Thus the cover can be effectively prevented from having an uneven thickness.

The present heat and compression molding process preferably includes a low pressure molding step of applying a pressure set within a range of 0.5 to 5 MPa and a subsequent, high pressure molding step of applying a pressure set within a range of 7 to 15 MPa. This can prevent air from remaining between the cover and the core and also provide the cover with a uniform thickness.

The low pressure molding step preferably applies a pressure within a range of 0.5 to 5 MPa, more preferably 1 to 4 MPa, still more preferably 2.5 to 3.5 MPa. A pressure of no less than 0.5 MPa hardly allows the half shells to first melt to allow air to remain between the half shells and the core, and the obtained ball can be completely free of such air otherwise introduced. Furthermore, a pressure of no more than 5 MPa can reduce the risk of the ball material receiving an excessive pressure before the half shells melt. The cover can thus be prevented from having an uneven thickness.

The high pressure molding step preferably applies a pressure within a range of 7 to 15 MPa, more preferably 7 to 14 MPa, still more preferably 8 to 13 MPa. If a pressure of no less than 7 MPa is applied, the amount of the cover material melting and thus flowing out of the mold can be controlled by pressurization. The cover can thus be effectively prevented from having an insufficient thickness. A pressure of no more than 15 MPa eliminates the risk of excessively exerted pressure and thus a damaging of the mold.

In the heat and compression molding process the low pressure molding step and the high pressure molding step can be performed for a period of time selected, as appropriate, depending on the cover material 2 and thickness, the ambient's temperature and the like. For example, the low pressure molding step can be performed for 1 to 6 minutes and the high pressure molding step can be performed 3 to 15 minutes.

In the present invention the cover preferably has a thickness of 0.3 to 1.0 mm. When the present invention is employed to produce a ball having a cover of a small thickness (for example 0.3 to 1.0 mm), in particular, it effectively reduces residual air between the cover and the core, insufficiency and unevenness in thickness of the cover, and other defects associated with molding. Note that in the present invention a cover has a thickness calculated as follows: a regular octahedron inscribed in a virtual golf ball is assumed and a land closest to each of six vertices is determined, and the cover's thickness is measured exactly under the six lands and averaged.

In the present invention a cover material mainly composed of a thermoplastic resin is employed. More specifically, the cover material preferably contains no less than 50% or by mass, more preferably no less than 80% by mass of the thermoplastic resin. Herein, the thermoplastic resin includes a thermoplastic elastomer, and the thermoplastic elastomer preferably occupies no less than 50% by mass, more preferably no less than 80% by mass, still preferably 100% by mass of the thermoplastic resin component as such provides the cover with an excellent physical property. A preferable thermoplastic elastomer is one that includes at least one of a thermoplastic polyurethane elastomer, a thermoplastic polyamide elastomer, a thermoplastic polyester elastomer, a thermoplastic styrene elastomer and other similar thermoplastic elastomers. The present invention can suitably be applied to a cover material mainly composed of a thermoplastic polyurethane elastomer, thermoplastic polyamide elastomer, a thermoplastic polyester elastomer or other similar soft elastomers. When a thermoplastic polyurethane elastomer is used, in particular, a significant effect can be obtained.

The thermoplastic elastomer for example is Elastollan produced by BASF Polyurethane Elastomers Ltd., Kuramilon produced by Kuraray Co., Ltd., Pandex produced by Dainippon Ink and Chemicals, Inc. and the like for thermoplastic polyurethane elastomer, Pebax produced by Toray, Industries Inc. for thermoplastic polyamide elastomer, Hytrel produced by Du Pont-Toray Co., Ltd. and the like for thermoplastic polyester elastomer, and Rabalon produced by Mitsui Petrochemical Industries Ltd., Septon produced by Kuraray Co., Ltd. and the like for thermoplastic styrene elastomer.

Furthermore, as the thermoplastic resins other than the above, ionomer resins, high density polyethylene, low density polyethylene, polypropylene or other similar olefin resins, nylon 6, nylon 66, nylon 11, nylon 12 or other similar nylon resins, natural rubber, polybutadiene rubber, polyisoprene rubber, ethylene-propylene-diene rubber (EPDM) or other similar rubber components can further be utilized.

For a cover material other than the thermoplastic resins serving as the main component, a co-curing agent, a crosslinking initiator, a filler, a colorant, a dispersant an antioxidant, a UV absorbent, a photo-stabilizer, a fluorescent material or fluorescent brightening agent and the like can appropriately be blended within a range that does not impair the cover's desired physical properties.

The present invention is applicable to producing a cover of a 2-piece golf ball including a core and the cover covering the core, a cover of a multipiece golf ball structured by at least three layers, and other similar covers. Note that if a core, a cover and an intermediate layer are provided, the intermediate layer may be a single layer, or two or more layers.

The core may be a solid layer or a thread-wound layer. For a solid core, a rubber compound can be used that, for example, has a rubber component including one or more of polybutadiene rubber, natural rubber, butyl rubber and the like with an ionomer resin as a co-curing agent and organic peroxide as a crosslinking initiator blended therewith and furthermore an additive added thereto, as appropriate, and is kneaded and molded. The intermediate layer, as well as the core, can be a solid layer or a thread-wound layer. If the core or the intermediate layer has a thread-wound layer, in forming the cover, a portion of air remaining between the core and the cover or between the intermediate layer and the cover as the cover is formed is absorbed into a gap of the thread-wound layer. For a solid golf ball, by contrast, there is no gap that can absorb air, and when the cover is molded to cover the ball it is necessary to ensure that the air is exhausted from the mold. In the present method the temperature of the mold and the allowing of the half shells to start to flow can define a relationship therebetween within a fixed range to ensure that the air remaining in the ball is exhausted from the mold. Thus a solid golf ball can be produced with a significant effect that cannot be achieved by conventional production methods.

The core can be produced by a generally known method. For example, components to be blended are mixed by means of a roll, a kneader, a banbury mixer or the like. The mixture is introduced into a mold, and pressurized at 145° C. to 200° C., preferably 150° C. to 175° C. for 10–40 minutes for vulcanization to produce a core. To allow the core and the cover to closely contact each other, the core may have a surface having an adhesive applied thereto or may have a roughened surface. External to the core, an intermediate layer can be further formed, for example, by injection molding or other similar technique.

The half shells can be produced by injection molding, heat and compression molding or other similar known techniques, for example, by introducing a cover material into a mold at a gap formed between a top piece having a protrusion and a bottom piece having a recess. For injection molding, for example a temperature of 200 to 250° C., a pressure of 3 to 7 MPa and the like can be applied.

EXAMPLE (1) Production of Golf Ball
Production of Core 100 parts by mass of hi cis polybutadiene rubber (JSR Corporation's BR01 having a cis-1,4-polybutadiene content of 96%), 27 parts by mass of zinc acrylate (ZNDA-90S produced by NIHON JYORYU KOGYO CO., Ltd.), 20 parts by mass of zinc oxide (produced by TOHO ZINC CO., LTD.), and 0.6 parts by mass of dicumyl peroxide (Percumyl D produced by NOF Corporation) are kneaded by a kneader and then introduced into a mold and press-formed at 160° C. for 20 minutes to produce a core having a diameter of 41.1 mm.

Production of Half Shell 80 parts by mass of thermoplastic polyurethane elastomer (Elastoran XNY97A produced by BASF Polyurethane Elastomers Ltd.), 20 parts by mass of thermoplastic polyamide elastomer (Pebax 5533 produced by Toray), and 5 parts by mass of titanium oxide (A-220 produced by ISHIHARA SANGYO KAISHA LTD.) are blended together to provide a cover material, which is in turn kneaded by a 2-axis kneader and extruder and extruded thereby at 230° C., and then injection molded to produce half shells different in thickness as shown in Table 1. The material is extruded under the following conditions:

| | |
|---|---|
| Screw's diameter: | 45 mm |
| Screw's rate of rotation: | 200 rpm |
| Screw's L/D: | 35 |

Note that the cover material is heated at the location of a die of the extruder to 195° C. to 205° C.

TABLE 1

| | | | Example 1 | Example 2 | Example 3 | Example 4 | Comparative Example 1 | Comparative Example 2 | Comparative Example 3 |
|---|---|---|---|---|---|---|---|---|---|
| Diameter of core (mm) | | | 41.1 | 41.1 | 41.1 | 41.1 | 41.1 | 41.1 | 41.1 |
| Thickness of cover (mm) | | | 0.8 | 0.8 | 0.8 | 0.8 | 0.8 | 0.8 | 0.8 |
| Thickness of half shell (mm) | | | 0.90 | 0.90 | 0.90 | 0.90 | 0.90 | 0.81 | 1.00 |
| Volume of half shell/volume of cover (%) | | | 113 | 113 | 113 | 113 | 113 | 101 | 125 |
| Temp. T2 (° C.) allowing half shells to start to flow | | | 125 | 120 | 125 | 125 | 122 | 130 | 138 |
| Conditions for heat and compression molding | Mold's temp. T1 (° C.) | | 123 | 123 | 130 | 133 | 133 | 123 | 123 |
| | T1–T2 (° C.) | | −2 | 3 | 5 | 8 | 11 | −7 | −15 |
| | Low pressure | Pressure (MPa) | 3 | 3 | 3 | 3 | 3 | 3 | 3 |
| | | Processing time (min.) | 3.5 | 3.5 | 3.5 | 3.5 | 3.5 | 3.5 | 3.5 |
| | High pressure | Pressure (MPa) | 11 | 11 | 11 | 11 | 11 | 11 | 11 |
| | | Processing time (min.) | 9 | 9 | 9 | 9 | 9 | 9 | 9 |
| Level of average uneven thickness of cover | | | 0.07 | 0.08 | 0.12 | 0.1 | 0.05 | 0.27 | 0.27 |

TABLE 1-continued

|  | Example 1 | Example 2 | Example 3 | Example 4 | Comparative Example 1 | Comparative Example 2 | Comparative Example 3 |
|---|---|---|---|---|---|---|---|
| Incidence of defective air between cover and core as externally observed (%) | 0 | 0 | 0 | 0 | 0 | 0 | 0 |
| Incidence of insufficient thickness of cover as externally observed (%) | 0 | 0 | 0 | 0 | 18 | 0 | 0 |
| Durability (No. of destructions/No. of impacts required for destruction) | 0 | 0 | 0 | 0 | 0 | 1/38 | 4/9,15,21,24 |

Two produced half shells are arranged on a core and joined together. The intermediate product is heat and compression molded under the conditions as shown in Table 1, and press formed 50 times and then painted to produce a golf ball.

(2) Evaluation of Temperature Allowing the Half Shells to Start to Flow

Temperature allowing the half shells to start to flow is measured using SHIMADZU-FLOWTESTER CFT-500 as measuring equipment with a plunger area of 1 cm², DIELENG of 1 mm, DIE DIA of 1 mm, and a load of 60 kgf (588.399 N) in a test performed with temperature raised at a constant rate.

(3) Evaluation of Level of Average Uneven Thickness of Cover

A ball obtained by pressing 50 times has its cover measured for maximum thickness and minimum thickness and the cover's uneven thickness level is calculated by the following expression:

Cover's average uneven thickness level=(cover's maximum thickness−cover's minimum thickness)/cover's average thickness.

The cover's maximum thickness and minimum thickness are obtained by measuring the cover's thickness as seen in a projected photograph obtained by radiographically imaging the ball. Table 1 shows a result thereof. Note that the result is represented in a value of an average of pressing 50 times.

(4) Evaluation of Incidence of Defective Air Between Cover and Core as Externally Observed A surface of a ball obtained after pressing 50 times is externally, visually observed and a frequency at which defective air between the cover and the core is observed with 50 times represented as 100% is represented in percentages. Table 1 shows a result thereof.

(5) Evaluation of Incidence of Insufficiency in Thickness of Cover as Externally Observed A surface of a ball obtained by pressing 50 times is externally, visually observed and a frequency at which a cover is observed as having an insufficient thickness with 50 times represented as 100% is represented in percentages. Table 1 shows a result thereof.

(6) Evaluation of Durability

A swing robot produced by Golf Laboratory and having a metal head W#1 driver attached thereto is used with a head speed set at 55 m/sec to hit a golf ball to measure the number of impacts required to destroy the golf ball. For each example and each comparative example 12 balls are hit up to 100 times, and how many balls are destroyed before they are hit 100 times and how many times each ball is hit before it is destroyed (represented as the number of destructions/the number of impacts required for destruction) are indicated in Table 1.

The present examples each shows that a cover has an average uneven thickness level of 0.2 or less, an incidence of defective air between the cover and the core, as externally observed, of 0%, an incidence of insufficiency in thickness of the cover, as externally observed, of 0%, and none of the balls is destroyed, as evaluated in durability. This reveals that the present method can form a cover of a uniform thickness and provide a golf ball having excellent durability. By contrast, comparative example 1, which performs a heat and compression molding process with a mold having a temperature too high relative to that allowing the half shells to start to flow, provides an incidence of defective air between the cover and the core, as externally observed, of as high as 18%. Comparative examples 2 and 3, in which the mold has a temperature too low relative to that allowing the half shells to start to flow, provide destruction, as evaluated in durability. It can thus be seen that the comparative examples fail to provide a golf ball with a cover satisfactorily covering the ball.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of producing a golf ball having a cover with a thickness of 0.3 to 1.0 mm which comprises:
    molding the cover, which is a material mainly composed of a thermoplastic resin, into two half shells which are in turn, arranged on a core or at least one intermediate layer and joined together as a composite,
    introducing the composite into a mold formed of semispherical pieces, and subjecting the composite to heat and compression to allows the cover to cover the core, wherein in the heat and compression molding process, if the mold has a temperature T1° C. and the half shells start to flow at a temperature T2° C., T1 minus T2 is set within a range of −3° C. to +10° C.

2. The method of claim 1, wherein the half shell is molded to allow the two half shells to have a total volume of 105% to 120% relative to that of the cover of the golf ball.

3. The method of claim 1, wherein the heat and compression molding process includes a low pressure molding step of exerting a pressure set within a range of 0.5 to 5 MPa and a subsequent, high pressure molding step of exerting a pressure set within a range of 7 to 15 MPa.

4. The method of claim 1, wherein the thermoplastic resin is a thermoplastic polyurethane elastomer.

* * * * *